(12) United States Patent
Kelly et al.

(10) Patent No.: US 8,041,535 B1
(45) Date of Patent: Oct. 18, 2011

(54) LOW-COST INTEGRATION OF INERTIAL SENSOR WITH ANGLE ENCODER ON A SWIVEL MOUNT TO ACCURATELY TRACK ANGLE CHANGES FROM A REFERENCE BEARING

(75) Inventors: Joseph M. Kelly, Center Point, IA (US); Patrick Y. Hwang, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 411 days.

(21) Appl. No.: 12/316,536

(22) Filed: Dec. 12, 2008

(51) Int. Cl.
*G01C 9/00* (2006.01)
*G01R 35/00* (2006.01)
(52) U.S. Cl. .......................... 702/151; 702/94; 702/150
(58) Field of Classification Search .................. 702/151, 702/150, 141, 142, 144, 145, 163
See application file for complete search history.

(56) References Cited

U.S. PATENT DOCUMENTS
3,731,544 A * 5/1973 Acker et al. .................. 74/5.22

FOREIGN PATENT DOCUMENTS
WO   WO 2006074768 A1 * 7/2006
* cited by examiner

*Primary Examiner* — Mohamed Charioui
*Assistant Examiner* — Manuel Rivera Vargas
(74) *Attorney, Agent, or Firm* — Daniel M. Barbieri

(57) ABSTRACT

The present invention is a targeting system for tracking angle changes from a reference azimuth. The system includes a mount. The mount may be configured for supporting a sighting scope. The system further includes an angle encoder which is integrated within the mount and is configured for tracking angle changes from the reference azimuth. The system further includes an inertial sensor which is communicatively which is also integrated within the mount and is configured for tracking angle changes from the reference azimuth. The system may be configured for selectively relying on angle change tracking provided by either the angle encoder or the inertial sensor.

24 Claims, 3 Drawing Sheets

LOW-COST INTEGRATION OF INERTIAL SENSOR WITH ANGLE ENCODER ON A SWIVEL MOUNT TO ACCURATELY TRACK ANGLE CHANGES FROM A REFERENCE BEARING

FIELD OF THE INVENTION

The present invention relates to the field of navigation systems and particularly to a system and method for providing low-cost integration of an inertial sensor with an angle encoder on a swivel mount for accurately tracking angle changes relative to a reference bearing.

BACKGROUND OF THE INVENTION

A number of current systems/methods for tracking angle changes from a reference bearing may not provide a desired level of performance.

Thus, it would be desirable to provide a system/method for tracking angle changes from a reference bearing which obviates the problems associated with current solutions.

SUMMARY OF THE INVENTION

Accordingly, an embodiment of the present invention is directed to a targeting system for tracking angle changes from a reference azimuth, including: a mount, said mount configured for supporting a sighting scope; an angle encoder, said angle encoder being integrated with said mount, the angle encoder configured for tracking angle changes from the reference azimuth; and an inertial sensor, said inertial sensor being integrated with said mount, said inertial sensor being communicatively coupled with said angle encoder, the inertial sensor configured for tracking angle changes from the reference azimuth, wherein the system is configured for selectively relying on angle change tracking provided by one of: the angle encoder and the inertial sensor.

An additional embodiment of the present invention is directed to a method for tracking angle changes from a reference azimuth via a targeting system, including: tracking angle changes from the reference azimuth via an angle encoder implemented in a sighting scope mount of the targeting system; tracking angle changes from the reference azimuth via an inertial sensor implemented in the sighting scope mount of the targeting system; providing an angle encoder output via the angle encoder based on said tracking performed by the angle encoder; and providing an inertial sensor output via the inertial sensor based on said tracking performed by the inertial sensor.

A further embodiment of the present invention is directed to a method for tracking angle changes relative to a reference azimuth via a targeting system, including: determining an angle change measurement relative to the reference azimuth via an angle encoder implemented in a sighting scope mount of the targeting system; determining an angle change measurement relative to the reference azimuth via an inertial sensor implemented in the sighting scope mount of the targeting system; outputting from the angle encoder the angle change measurement determined by said angle encoder; and outputting from the inertial sensor the angle change measurement determined by said inertial sensor.

A still further embodiment of the present invention is directed to a computer-readable medium having computer-executable instructions for performing a method for tracking angle changes relative to a reference azimuth via a targeting system, said method including: determining an angle change measurement relative to the reference azimuth via an angle encoder implemented in a sighting scope mount of the targeting system; determining an angle change measurement relative to the reference azimuth via an inertial sensor implemented in the sighting scope mount of the targeting system; outputting from the angle encoder the angle change measurement determined by said angle encoder; and outputting from the inertial sensor the angle change measurement determined by said inertial sensor.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

A targeting system may generally involve an observer sighting a target to extract a range and a bearing to the target in order to determine a position of the target relative to a position of the observer. The observer position may be accurately determined via a satellite-based navigation system (ex.—Global Positioning System (GPS), Global Navigation Satellite System (GLONASS), etc.). The ability to accurately determine the target position depends greatly on the extraction of the range and the bearing. Extraction of the range may be performed using laser range finders. However, extraction/accurate determination of the bearing (ex.—with respect to due north) may be a more difficult task and a much greater source of error.

Solutions have been proposed for accurately determining bearing with respect to due north/for solving the azimuth determination problem/for finding North. A number of these solutions may be operated only once or occasionally, and may experience a companion problem when attempting to track the angle changes of the sighting system from the reference azimuth where it was originally calibrated. This aspect of the problem is called "coasting" or "keeping North".

Figure 1:
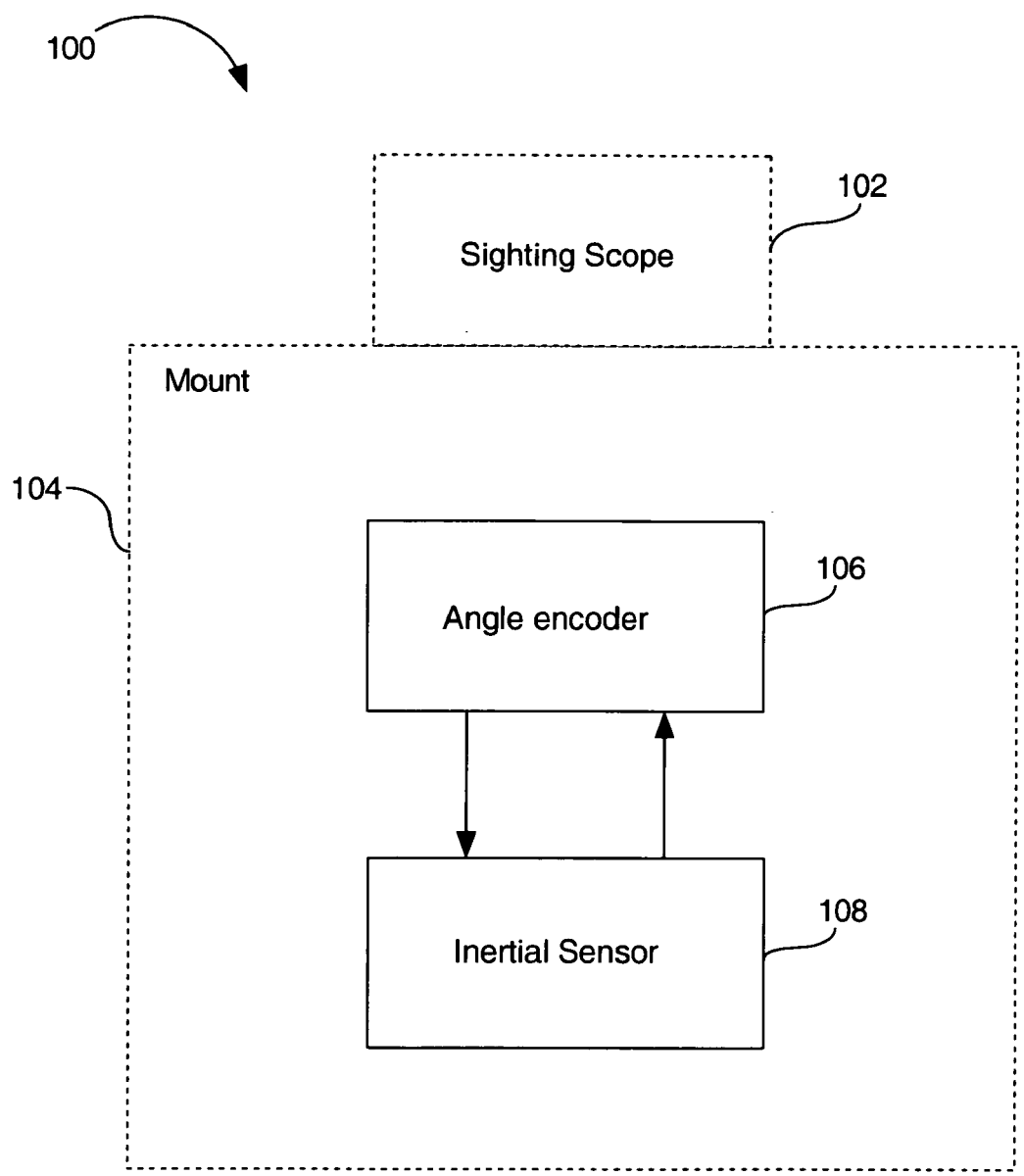
FIG. 1 is a block diagram schematic of a system for tracking angle changes from a reference azimuth in accordance with an exemplary embodiment of the present invention.

Referring generally to FIG. 1, a system (ex.—targeting system) for tracking angle changes from/relative to/with respect to a reference bearing (ex.—a system for tracking angular deviation/change from a reference azimuth) in accordance with an exemplary embodiment of the present invention is shown. In an exemplary embodiment of the present invention, the system 100 may include a sighting scope 102.

Further, the system includes a mount 104 which may be configured for supporting/stabilizing the sighting scope 102. For example, the sighting scope 102 may be configured to rest upon the mount 104. In current embodiments of the present invention, the mount 104 may be configured for supporting the sighting scope 102, while allowing the sighting scope 102 to swivel upon/be pivotally connected to/form a swivel connection with the mount 104 (ex.—the mount may be a swivel mount). By having the sighting scope 102 rest upon/be securably attached to a mount 104, rather than being a hand-held sighting scope implementation, excessive jitter of the sighting scope 102 may be prevented, thereby promoting improved target sighting accuracy and promoting provision of a high degree of angular accuracy, which may be required when target sighting from a great distance.

In further embodiments of the present invention, the system 100 may further include at least one angle encoder 106. For example, the angle encoder 106 may be an optical encoder (ex.—an incremental optical encoder) or, in alternative embodiments, the angle encoder 106 may be a magnetic resolver. The angle encoder 106 may be configured for being installed in/may be included as part of the mount 104. In exemplary embodiments of the present invention, the angle encoder 106 may be configured for tracking (ex.—mechanically tracking) angle change(s) from/relative to a reference bearing/reference azimuth. For instance, the reference azimuth may be an azimuth which was previously established/determined, such as when the system 100 (ex.—angle encoder 106) was originally/initially/previously calibrated. In exemplary embodiments of the present invention, if the mount 104 allows the sighting scope 102 to swivel over a large sweep angle, the angle encoder 106 of the mount 104 may be configured for mechanically tracking angle changes from the reference azimuth. For example, as long as the mount 104 (ex.—footing of the mount) rests on solid ground and does not move, the angle encoder 106 may be able/may be relied upon by the system 100 (ex.—primarily relied upon by the system 100) to accurately track angle changes from the reference azimuth, and said angle encoder 106 may be able to accurately track said changes without experiencing drift error over time. However, during a loss of footing event, the angle encoder 106 may experience inaccuracy in tracking angle changes from the reference azimuth.

In exemplary embodiments of the present invention, the system 100 may further include one or more inertial sensor(s) 108. The inertial sensor 108 may be/may include directional gyro(s)/gyroscope(s) (ex.—microelectromechanical systems (MEMS) directional gyro(s)), accelerometer(s) and/or the like. Further, the inertial sensor 108 may be configured for tracking angle change(s) from/relative to a reference bearing/reference azimuth. In additional embodiments of the present invention, the inertial sensor 108 may be configured for being communicatively coupled with the angle encoder 106. For example, the inertial sensor 108 may be configured for being installed in/may be included as part of the mount 104 and may be configured for monitoring/cross-monitoring an output provided by the angle encoder 106. In further embodiments, the one or more inertial sensor(s) 108 may be included as part of an Inertial Measurement Unit (IMU) 110. For instance, the IMU 110 may be communicatively coupled with the angle encoder 106, may be further configured for being installed within/included as part of the mount 104, and may be further configured for monitoring/cross-monitoring an output (ex.—angle encoder output/angle encoder data) provided by the angle encoder 106.

As mentioned above, the angle encoder 106 and the inertial sensor 108 of the system 100 of the present invention may be communicatively coupled, and thus, may be configured for working/operating in a complementary manner. For example, as mentioned above, in the event that the system 100/swiveling mount 104 loses its footing on/loses physical contact with a surface upon which the mount 104 is positioned, the ability of the angle encoder 106 to accurately track angle change(s) relative to the reference azimuth may be compromised (ex.—the angle encoder 106 may inaccurately track said angle change(s) relative to the reference azimuth) and said angle encoder may provide an output (ex.—the angle encoder output) which includes/provides an indication of said inaccuracy. In exemplary embodiments of the present invention, the inertial sensor 108, via its cross-monitoring of the output of the angle encoder 106, may be configured for determining/detecting that a measure of angular change with respect to the reference azimuth as measured/tracked by the angle encoder 106 may be in disagreement with a measure of angular change with respect to the reference azimuth determined by the inertial sensor 108. When the system 100/inertial sensor 108 detects that said disagreement exists, the system 100 may cause the inertial sensor 108 to be relied upon (ex.—primarily relied upon) to track angular changes relative to the reference azimuth during the brief window of time when said event (ex—movement/displacement/loss of footing/bumping/tilting/dislodging/jostling of the system 100/swiveling mount 104) is occurring.

In current embodiments of the present invention, once the system 100/inertial sensor 108 determines that said event is no longer occurring (ex—said system 100/swiveling mount 104 has come to rest upon/stopped moving along/has been stabilized upon the surface) then, said system 100 may cause/may allow the angle encoder 106 to be re-calibrated. Once said angle encoder 106 is re-calibrated, the system 100 may cause/allow the angle encoder 106 to again be depended upon (ex.—primarily depended upon) for tracking angle changes from the reference azimuth. As mentioned previously, as long as the swivel mount 104 (ex.—footing of the swivel mount) is supported on a solid surface, and remains in place/securely in place/stabilized upon said surface, the angle encoder 106 of the system 100 of the present invention may be relied upon to accurately track angle changes from the reference azimuth, and should experience minimal/no drift error over an extended period of time. If a displacement of the system 100/mount 104 occurs, which may cause the angle encoder 106 to experience operational error, the system of the present invention allows the inertial sensor 108/IMU 110 to take over (to be relied upon primarily for) tracking of angle changes from reference azimuth for the system 100. Because the inertial sensor 108 may only need to be relied upon for a short window of time for tracking angle changes from reference azimuth, inexpensive inertial sensors 108 may be implemented. This may allow the system 100, which combines/packages together the inertial sensor 108 with the angle encoder 106, to be provided as an inexpensive, compact unit which is low SWAP-C (size, weight and power cost) and may be suitable for use by Special Operations forces in the field. Further, by only relying upon said inertial sensor 108 over a short time window, the system 100 of the present invention promotes reduction in drift error, since said inertial sensor is very stable over a short term. Still further, said system 100 of the present invention may be configured for providing a "coasting" system capable of maintaining azimuth accuracy of a few milliradians for an extended period of time in a tactical environment where the unit/system may be bumped, tilted, jostled, or moved.

Figure 2:
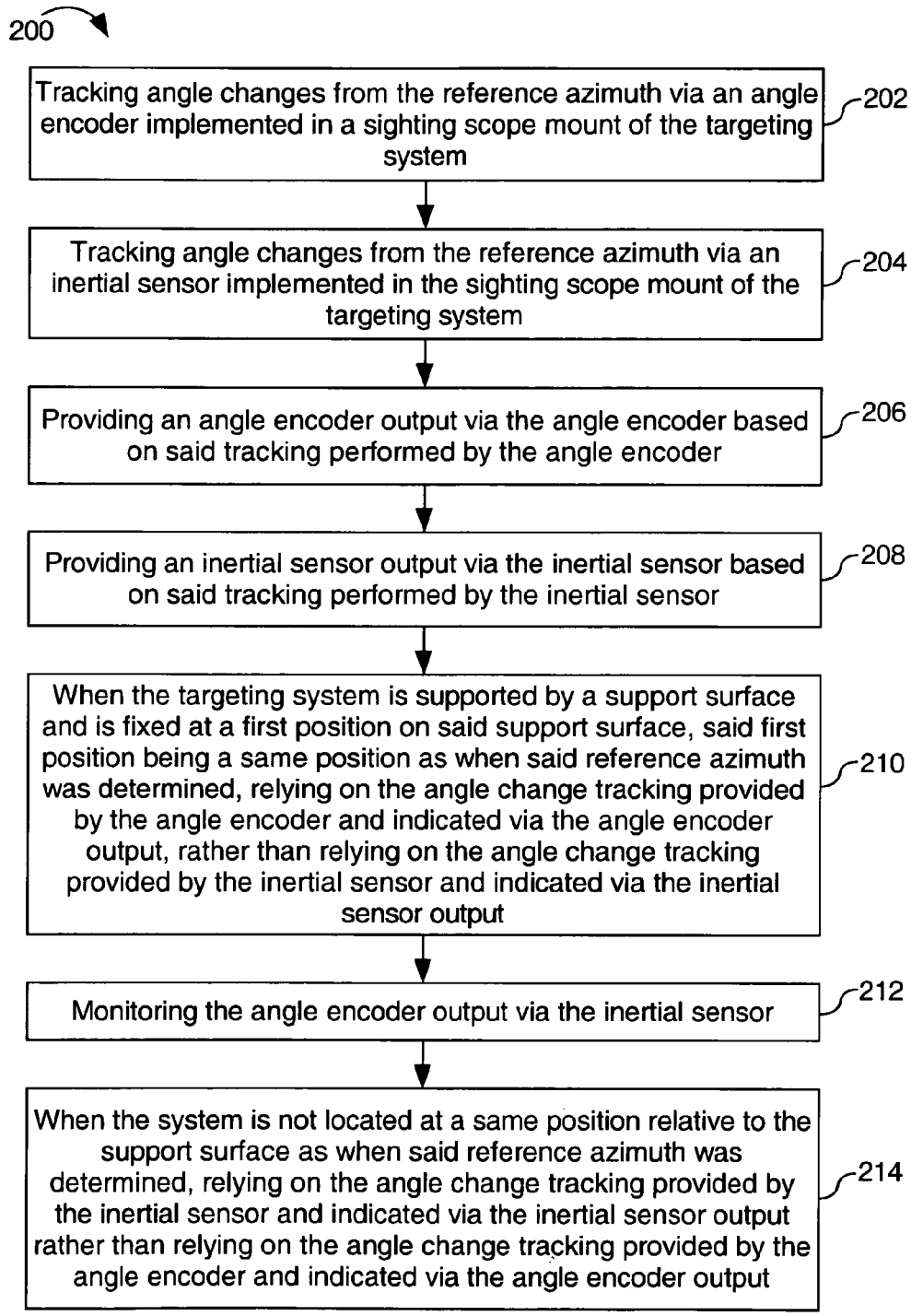
FIG. 2 is a flowchart illustrating a method for tracking angle changes from a reference azimuth in accordance with an exemplary embodiment of the present invention.

Referring to FIG. 2, a flow chart illustrating a method for tracking angle changes relative to a reference azimuth in accordance with an exemplary embodiment of the present invention is shown. In a current embodiment of the present invention, the method 200 may include the step of tracking angle changes from the reference azimuth via an angle encoder implemented in a sighting scope mount of the targeting system 202. The method 200 may further include tracking angle changes from the reference azimuth via an inertial sensor implemented in the sighting scope mount of the targeting system 204. The method 200 may further include providing an angle encoder output via the angle encoder based on said tracking performed by the angle encoder 206. The method 200 may further include providing an inertial sensor output via the inertial sensor based on said tracking performed by the inertial sensor 208.

In exemplary embodiments, the method 200 may further include when the targeting system is supported by a support surface and is fixed at a first position on said support surface, said first position being a same position as when said reference azimuth was determined, relying on the angle change tracking provided by the angle encoder and indicated via the angle encoder output, rather than relying on the angle change tracking provided by the inertial sensor and indicated via the inertial sensor output 210. The method 200 may further include monitoring the angle encoder output via the inertial sensor 212. In additional embodiments, the method 200 may further include when the system is not located at a same position relative to the support surface as when said reference azimuth was determined, relying on the angle change tracking provided by the inertial sensor and indicated via the inertial sensor output rather than relying on the angle change tracking provided by the angle encoder and indicated via the angle encoder output 214. The method 200 may further include when the system at least partially loses physical contact with the support surface, relying on the angle change tracking provided by the inertial sensor and indicated via the inertial sensor output rather than relying on the angle change tracking provided by the angle encoder and indicated via the angle encoder output 216. The method 200 may further include when the angle encoder output and the inertial sensor output are in disagreement, relying on the angle change tracking provided by the inertial sensor and indicated via the inertial sensor output rather than relying on the angle change tracking provided by the angle encoder and indicated via the angle encoder output 218. The method 200 may further include when the inertial sensor determines that the system is at rest on the support surface, relying on the angle change tracking provided by the angle encoder and indicated via the angle encoder output rather than relying on the angle change tracking provided by the inertial sensor and indicated via the inertial sensor output 220.

Figure 3:
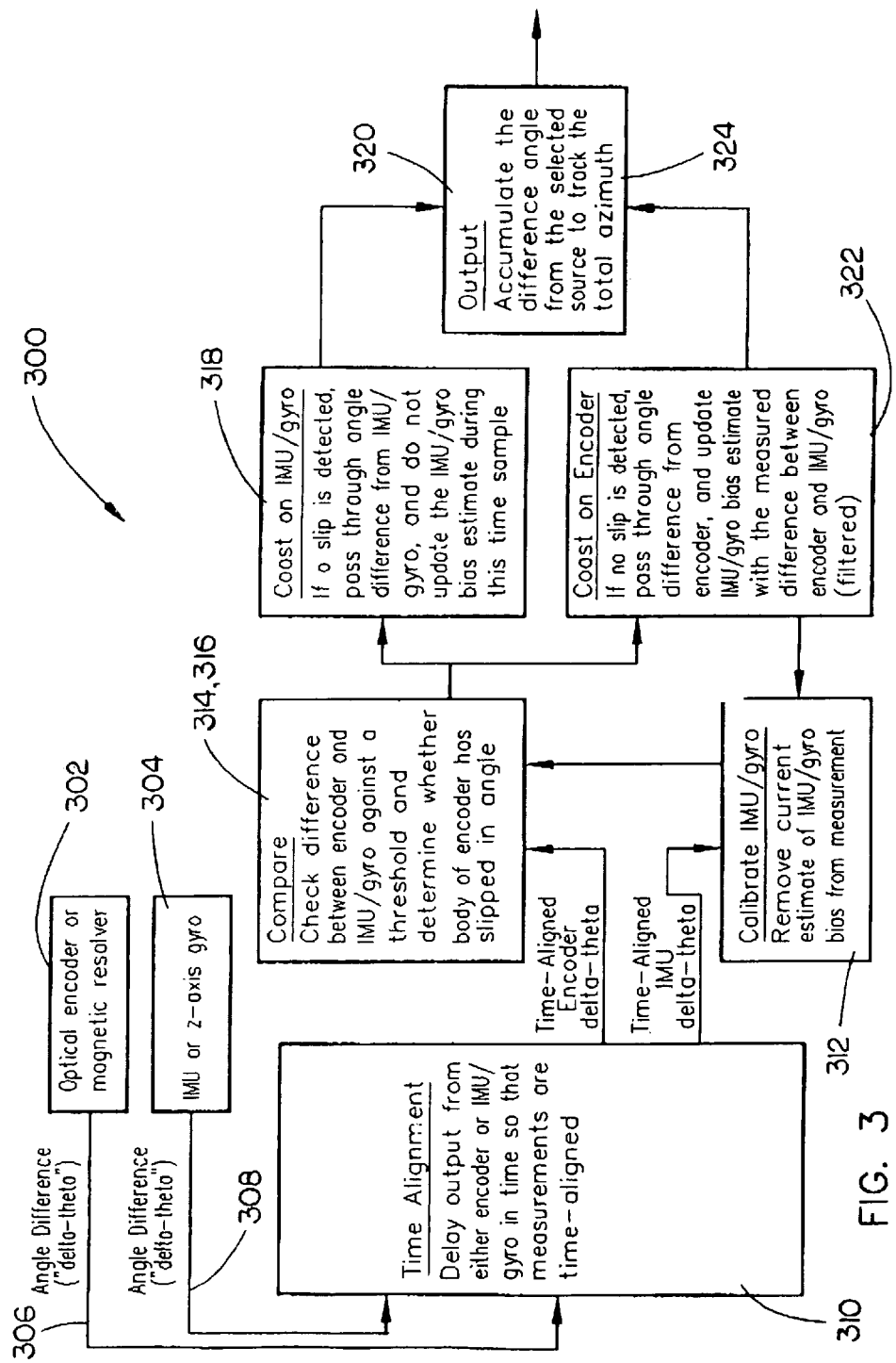
FIG. 3 is a block diagram flow schematic illustrating a method for tracking angle changes relative to a reference azimuth via a targeting system in accordance with an exemplary embodiment of the present invention.

Referring generally to FIG. 3, a block diagram flow schematic illustrating a method for tracking angle changes relative to a reference azimuth via a targeting system in accordance with an exemplary embodiment of the present invention is shown. In a current embodiment of the present invention, the method 300 may include the step of determining an angle change measurement relative to the reference azimuth via an angle encoder implemented in a sighting scope mount of the targeting system 302. For example, the angle encoder may be an optical encoder, a magnetic resolver, or the like, as mentioned above. The method 300 may further include determining an angle change measurement relative to the reference azimuth via an inertial sensor implemented in the sighting scope mount of the targeting system 304. For instance, the inertial sensor may be/may include a z-axis gyro, or may be/may be included as part of an IMU.

In current embodiments of the present invention, the method 300 may further include the step of outputting from the angle encoder the angle change measurement (ex.—delta theta) determined by said angle encoder 306. The method 300 may further include the step of outputting from the inertial sensor the angle change measurement (ex.—delta theta) determined by said inertial sensor 308. In exemplary embodiments, one of: the inertial sensor angle change measurement output and the angle encoder angle change measurement output may be delayed 310, so as to time-align the angle encoder angle change measurement output and the inertial sensor angle change measurement output with each other. This delaying/time-aligning step results in/produces a time-aligned angle encoder angle change measurement (ex.—time-aligned encoder delta-theta) and a time-aligned inertial sensor angle change measurement (ex.—time-aligned IMU delta theta).

In further embodiments, the method 300 may further include the step of calibrating the inertial sensor/removing an estimated inertial sensor bias from the time-aligned inertial sensor angle change measurement, thereby resulting in/producing a filtered time-aligned inertial sensor angle change measurement 312. The method 300 further includes comparing the filtered time-aligned inertial sensor angle change measurement with the time-aligned angle encoder angle change measurement 314.

In exemplary embodiments, when a difference is detected between the compared filtered time-aligned inertial sensor angle change measurement and the time-aligned angle encoder angle change measurement, the method 300 may further include comparing said difference to a threshold value to determine if the angle encoder has slipped (ex.—to determine whether the mount has been moved from its position/lost physical contact with a surface upon which said mount was positioned, etc) 316. Further, when said difference exceeds said threshold value (ex.—when a slip is detected by the system/inertial sensor), the method 300 may further include passing through/transmitting (via the system)/outputting (from or via the system)/selecting via the system/relying upon the filtered time-aligned inertial sensor angle change measurement in favor of the time-aligned angle encoder angle change measurement 318. For example, during a time sample when said filtered time-aligned inertial sensor angle change measurement is passed through/transmitted/selected in favor of the time-aligned angle encoder angle change measurement, the system 100 will not update a value associated with said estimated inertial sensor bias. Additionally, the method 300 may further include accumulating angle difference (ex.—tracking angle changes relative to the reference azimuth based on the filtered time aligned inertial sensor angle change measurement (and subsequent filtered time aligned inertial sensor angle change measurements)) 320.

In alternative embodiments, when said difference is one of: at or below said threshold value (ex.—when a slip is not detected by the system) in comparison step 316, the method 300 may further include the step of passing through/transmitting (via the system)/outputting (from or via the system)/selecting via the system/relying upon the time-aligned angle encoder angle change measurement in favor of the filtered time-aligned inertial sensor angle change measurement 322. For example, during a time sample when said time-aligned angle encoder angle change measurement is passed through/transmitted/selected in favor of the filtered time-aligned inertial sensor angle change measurement, the system 100 will update the value associated with said estimated inertial sensor bias with the measured difference between the compared filtered time-aligned inertial sensor angle change measurement and the time-aligned angle encoder angle change measurement. Additionally, the method 300 may further include accumulating angle difference (ex.—tracking angle changes relative to the reference azimuth based on the time-aligned angle encoder angle change measurement (and subsequent time-aligned angle encoder angle change measurements)) 324.

In exemplary embodiments, any one or more of the steps 312 through 322 above may be performed by the inertial sensor. In further alternative embodiments, when said inertial sensor (ex.—IMU) detects sudden motion of the mount relative to the surface upon which said mount is supported, the time-aligned angle encoder angle change measurement (ex.—encoder data) may be suppressed (ex.—not selected/not passed through) and the filtered time-aligned inertial sensor angle change measurement may be relied upon in favor of the time-aligned angle encoder angle change measurement. In still further alternative embodiments, when an external input is provided to the system 100, such as via a user, which indicates to the system/advises the system of anticipated motion of the mount relative to the surface upon which said mount is supported, the time-aligned angle encoder angle change measurement (ex.—encoder data) may be suppressed (ex.—not selected/not passed through) and the filtered time-aligned inertial sensor angle change measurement may be relied upon in favor of the time-aligned angle encoder angle change measurement.

In additional embodiments, when no difference is detected between the compared filtered time-aligned inertial sensor angle change measurement and the time-aligned angle encoder angle change measurement, the method 300 may include outputting the time-aligned angle encoder angle change measurement in favor of the filtered time-aligned inertial sensor angle change measurement and accumulating angle difference and tracking angle changes relative to the reference azimuth based on the time-aligned angle encoder angle change measurement.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A targeting system for tracking angle changes from a reference azimuth, comprising:
   a mount, said mount configured for supporting a sighting scope;
   an angle encoder, said angle encoder being integrated with said mount, the angle encoder configured for tracking angle changes from the reference azimuth; and
   an inertial sensor, said inertial sensor being integrated with said mount, said inertial sensor being communicatively coupled with said angle encoder, the inertial sensor configured for tracking angle changes from the reference azimuth,
   wherein, when the target system is supported by a support surface and is fixed at a first position on said support surface, the system is configured for determining the reference azimuth, the system being further configured for selectively relying on angle change tracking provided by one of: the angle encoder and the inertial sensor, such that when the targeting system is fixed at a same position on said support surface as when said reference azimuth was determined, utilizing the angle change tracking provided by the angle encoder instead of the angle change tracking provided by the inertial sensor.

2. A targeting system as claimed in claim 1, wherein the inertial sensor is configured for monitoring an output of the angle encoder.

3. A targeting system as claimed in claim 2, wherein the inertial sensor is configured for detecting a disagreement between the angle encoder and the inertial sensor based on the monitored output.

4. A targeting system as claimed in claim 1, further comprising:
   a sighting scope configured for being supported by the mount.

5. A targeting system as claimed in claim 1, wherein the angle encoder is one of: an optical encoder; and a magnetic resolver.

6. A targeting system as claimed in claim 1, wherein the inertial sensor includes a microelectrical mechanical systems (MEMS) directional gyroscope.

7. A targeting system as claimed in claim 1, wherein the mount is a swivel mount.

8. A method for tracking angle changes from a reference azimuth via a targeting system, comprising:
   when the target system is supported by a support surface and is fixed at a first position on said support surface, determining the reference azimuth;
   tracking angle changes from the reference azimuth via an angle encoder implemented in a sighting scope mount of the targeting system;
   tracking angle changes from the reference azimuth via an inertial sensor implemented in the sighting scope mount of the targeting system;
   providing an angle encoder output via the angle encoder based on said tracking performed by the angle encoder;

providing an inertial sensor output via the inertial sensor based on said tracking performed by the inertial sensor;

when the targeting system is fixed at a same position on said support surface as when said reference azimuth was determined, utilizing the angle change tracking provided by the angle encoder and indicated via the angle encoder output.

9. A method as claimed in claim 8, further comprising:
monitoring the angle encoder output via the inertial sensor.

10. A method as claimed in claim 9, further comprising:
when the system is not located at the same position relative to the support surface as when said reference azimuth was determined, utilizing the angle change tracking provided by the inertial sensor and indicated via the inertial sensor output.

11. A method as claimed in claim 10, further comprising:
when the system at least partially loses physical contact with the support surface, utilizing the angle change tracking provided by the inertial sensor and indicated via the inertial sensor output.

12. A method as claimed in claim 11, further comprising:
when the angle encoder output and the inertial sensor output are in disagreement, utilizing the angle change tracking provided by the inertial sensor and indicated via the inertial sensor output.

13. A method as claimed in claim 12, further comprising:
when the inertial sensor determines that the system is at rest on the support surface, utilizing the angle change tracking provided by the angle encoder and indicated via the angle encoder output.

14. A method for tracking angle changes relative to a reference azimuth via a targeting system, comprising:
determining an angle change measurement relative to the reference azimuth via an angle encoder implemented in a sighting scope mount of the targeting system;
determining an angle change measurement relative to the reference azimuth via an inertial sensor implemented in the sighting scope mount of the targeting system;
outputting from the angle encoder the angle change measurement determined by said angle encoder;
outputting from the inertial sensor the angle change measurement determined by said inertial sensor;
delaying one of: the inertial sensor angle change measurement output and the angle encoder angle change measurement output to time-align the inertial sensor angle change measurement output and the angle encoder angle change measurement output, thereby producing a time-aligned inertial sensor angle change measurement and a time-aligned angle encoder angle change measurement;
removing an estimated inertial sensor bias from the time-aligned inertial sensor angle change measurement, thereby producing a filtered time-aligned inertial sensor angle change measurement;
comparing the filtered time-aligned inertial sensor angle change measurement with the time-aligned angle encoder angle change measurement; and
when a difference is detected between the compared filtered time-aligned inertial sensor angle change measurement and the time-aligned angle encoder angle change measurement, comparing said difference to a threshold value to determine if the angle encoder has slipped.

15. A method as claimed in claim 14, further comprising:
when said difference exceeds said threshold value, outputting the filtered time-aligned inertial sensor angle change measurement.

16. A method as claimed in claim 15, further comprising:
accumulating angle difference and tracking angle changes relative to the reference azimuth based on the filtered time-aligned inertial sensor angle change measurement.

17. A method as claimed in claim 14, further comprising:
when said difference is one of: at said threshold level or below said threshold level, outputting the time-aligned angle encoder angle change measurement.

18. A method as claimed in claim 17, further comprising:
accumulating angle difference and tracking angle changes relative to the reference azimuth based on the time-aligned angle encoder angle change measurement.

19. A method as claimed in claim 14, further comprising:
when no difference is detected between the compared filtered time-aligned inertial sensor angle change measurement and the time-aligned angle encoder angle change measurement, outputting the time-aligned angle encoder angle change measurement and accumulating angle difference and tracking angle changes relative to the reference azimuth based on the time-aligned angle encoder angle change measurement.

20. A non-transitory computer-readable medium having computer-executable instructions stored therein for causing a computer processor to perform a method for tracking angle changes relative to a reference azimuth via a targeting system, said method comprising:
determining an angle change measurement relative to the reference azimuth via an angle encoder implemented in a sighting scope mount of the targeting system;
determining an angle change measurement relative to the reference azimuth via an inertial sensor implemented in the sighting scope mount of the targeting system;
outputting from the angle encoder the angle change measurement determined by said angle encoder;
outputting from the inertial sensor the angle change measurement determined by said inertial sensor;
delaying one of: the inertial sensor angle change measurement output and the angle encoder angle change measurement output to time-align the inertial sensor angle change measurement output and the angle encoder angle change measurement output, thereby producing a time-aligned inertial sensor angle change measurement and a time-aligned angle encoder angle change measurement;
removing an estimated inertial sensor bias from the time-aligned inertial sensor angle change measurement, thereby producing a filtered time-aligned inertial sensor angle change measurement;
comparing the filtered time-aligned inertial sensor angle change measurement with the time-aligned angle encoder angle change measurement;
when no difference is detected between the compared filtered time-aligned inertial sensor angle change measurement and the time-aligned angle encoder angle change measurement, outputting the time-aligned angle encoder angle change measurement and accumulating angle difference and tracking angle changes relative to the reference azimuth based on the time-aligned angle encoder angle change measurement; and
when a difference is detected between the compared filtered time-aligned inertial sensor angle change measurement and the time-aligned angle encoder angle change measurement, comparing said difference to a threshold value to determine if the angle encoder has slipped.

21. A non-transitory computer-readable medium as claimed in claim 20, said method further comprising:
when said difference exceeds said threshold value, outputting the filtered time-aligned inertial sensor angle change measurement.

22. A non-transitory computer-readable medium as claimed in claim 21, said method further comprising:
accumulating angle difference and tracking angle changes relative to the reference azimuth based on the filtered time-aligned inertial sensor angle change measurement.

23. A non-transitory computer-readable medium as claimed in claim 20, said method further comprising:
when said difference is one of: at said threshold level or below said threshold level, outputting the time-aligned angle encoder angle change measurement.

24. A non-transitory computer-readable medium as claimed in claim 23, said method further comprising:
accumulating angle difference and tracking angle changes relative to the reference azimuth based on the time-aligned angle encoder angle change measurement.

* * * * *